Jan. 1, 1946.                R. A. GOEPFRICH                2,392,242
                              RETAINING DEVICE
                            Filed Jan. 10, 1944

INVENTOR.
RUDOLPH A. GOEPFRICH
BY
*T. J. Plante*
ATTORNEY.

Patented Jan. 1, 1946

2,392,242

UNITED STATES PATENT OFFICE 2,392,242

RETAINING DEVICE

Rudolph A. Goepfrich, South Bend, Ind.

Application January 10, 1944, Serial No. 517,641

11 Claims. (Cl. 85—8)

This invention, as indicated, relates to a retaining device. More particularly it comprises a securing device adapted to be engaged within a groove formed in the periphery of a pin or bolt or equivalent member, and to be positively locked upon such member.

In order to replace cotter pins as retaining devices for limting relative longitudinal movement between pins or shafts or the like and the members through which they pass, it has been proposed to provide washers, or self-locking collars, which are fitted into peripheral or circumferential grooves in said pins or like elements, and are subsequently locked in position thereon. Retaining devices of this type have certain advantages over cotter pins, such as the provision of a greater thrust bearing area against both the pin and the member through which it extends, and the simplification of the manufacturing process by substituting the operation of turning a groove in the circumference of the pin for the operation of drilling a hole transversely through the pin.

The present invention provides a retaining device which has the advantages of the washer type of device over the cotter pin, and additionally has several advantages over the types of washers heretofore proposed.

Among the washers heretofore proposed, those which are currently most widely used are formed by a stamping or punching process, wherein they are cut out of flat sheet metal stock. In this process, waste of material is unavoidable, and the amount of stock which becomes scrap bears a high ratio to the amount of metal in the finished washer. For example, analyzing the material requirements of two of the most common retaining washers, which I shall term types A and B, I find the following: the area of type A, to be used with a given size pin, is .233 square inch, and the corresponding area of scrap is .279 square inch. In manufacturing 100,000 pieces of type A, 968 lbs. of steel are necessary. Of this total, 440 lbs. is the weight of the finished parts, while the weight of scrap is 528 lbs. The area of type B, to be used with the assumed size pin, is .1519 square inch, the area of the corresponding scrap being .237 square inch. In manufacturing 100,000 pieces of type B, 735 lbs. of steel are required. Of this, 287 lbs. is the weight of the finished parts, while 448 lbs. is the weight of the scrap. Obviously, it would be highly advantageous to substitute a retaining washer which would reduce the amount of material required, and reduce or eliminate the wastage of material.

Accordingly, it is an object of the present invention to provide a retaining washer which will require less material to make than washers heretofore used, and which will eliminate waste of material during the manufacture of the washer. For example, comparing my improved retaining washer to types A and B mentioned above, the area of my washer, for the same size pin assumed in analyzing types A and B, is .169 square inch. The total weight of steel required to form 100,000 pieces is 319 lbs., the entire weight being attributable to the finished parts since there is no scrap.

Another object of the present invention is to provide a retaining washer which is easier to lock in position and to unlock preparatory to disassembly than washers which have heretofore been used. Although it may be desired to remove the washers, after having assembled the parts, certain of said washers heretofore used have been almost impossible to disassemble after they have once been fixed in position. The washer of the present invention not only is removable, but it may be used again.

Yet another object of the present invention is to provide a retaining device which will be less expensive to manufacture than other retaining devices.

A still further object of the present invention is to provide a retaining washer which can be fashioned by an automatic wire-forming machine by means of an extremely rapid operation.

A still further object of the present invention is to provide a retaining washer which is not limited in usefulness to being positioned at the end of the pin or like member which is to be retained. Certain washers now in use are so formed that they cannot be attached to a pin except when the retaining groove is very near the end of the pin.

Other objects and advantages of the present invention will become apparent during the course of the following description, reference being had therein to the accompanying drawing, in which.

Figure 1:
Figure 1 is a perspective view of a metal strip or length of wire from which my improved retaining device may be fashioned.

The form of my improved retaining washer is such that it may be conveniently made from a thin metal (or other material) strip or wire, for example, the wire 22 of Figure 1. The particular cross-section of the wire is not material.

In the punch press method of manufacture, the wire 22 may first be cut to the proper length from a long strip or from a coil of wire. This prepared length of wire is then formed to the shape illustrated in Figure 2 in a die. There is no leftover material since the entire prepared length of wire is used to produce the final formed retainer shown in Figure 2.

In the automatic wire-forming machine, one end of a coil of wire would be fed into the machine to a given distance. Then, the end of the coil would be formed to the shape illustrated in Figure 2 and finally sheared off from the end of the coil. In this method, likewise, there is no wastage of material.

Figure 2:
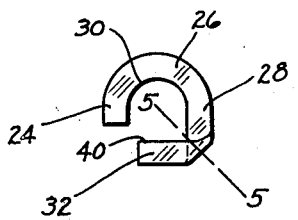
Figures 2 and 3 are plan and front views, respectively, of my improved retaining device after it has been formed from the wire stock and before it has been placed in position and locked.
Figure 3:
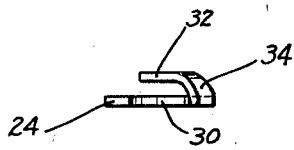

As shown in Figures 2 and 3, the finished retaining device has a generally U-shaped body portion, having a relatively short arm or side 24, a curved base 26, and a somewhat longer arm 28 parallel to the arm 24. The semicircular inner surface 30 of the base 26 is adapted to fit against the curved bottom of a groove cut in the shaft or like member on which the retaining device is to be locked.

The arm 28 of the retaining device has an extending portion 32 which is turned upwardly and inwardly, as shown, until it extends laterally across the mouth of the U, or in other words, the portion 32 extends in a direction substantially perpendicular to the direction in which the arms 24 and 28 of the U extend. However, the portion 32 does not lie in the plane of the U, but preferably in a plane parallel to the plane of the U, and raised somewhat above it, as best seen in Figure 3. In the illustrated device, the curved portion 34 of the retaining device is turned about an axis which is parallel to the plane of the U midway between said plane and that of the portion 32, and at an angle of 45 degrees to both the arm 28 of the U and the portion 32. The location of the axis is not limited, nor is the final direction of the extending portion 32. However the arrangement shown has the advantage that the portion 32 is quite easily aligned with the edge of the shaft, and thus brought into engagement with the shaft to prevent rattling of the retaining device.

Figure 11:
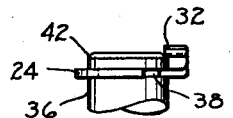
Figure 11 is a closeup of a retaining device and pin end showing how a chamfer on the pin end can aid in locating the retaining device and prevent rattling of the same.
Figure 4:
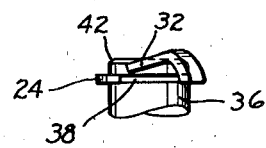
Figure 4 shows the retaining device locked in position on a pin or shaft.

After the retaining device is formed as shown in Figures 2 and 3, it is slipped over the end of the pin 36, which has been previously formed with a peripheral groove 38, as shown in Figure 4, the curved edge 30 fitting against the bottom of the groove. In the assembling operation, the cross arm 32 clears the end of the pin. It is then turned down as shown in Figure 4 to prevent displacement of the retaining device, the cross arm being sufficiently far spaced from the bottom portion of the U to clear the outer peripheral portion of the pin. Preferably the inner edge 40 of the cross arm 32 is brought into direct contact with the periphery of the pin to hold the retaining device firmly in place. This result may be facilitated by providing a chamfer 42 (as shown in Figure 11) on the end of the pin, in order that the edge 40 of the cross arm 32 may be first brought into contact with the chamfered portion and slid along until it embraces the full width of the pin. The turning down of the cross arm 32 is easily accomplished by using pliers or similar tools. Furthermore, if it becomes necessary to remove the retaining device, the cross arm may be bent upward, and the washer removed. This does not incapacitate the retaining device for further use.

Figure 5:
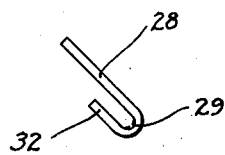
Figure 5 is a view showing the retaining device of Figure 2 rotated through approximately 90 degrees on the imaginary axis 5—5.
Figure 6:
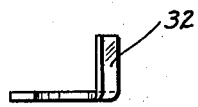
Figure 6 shows the manner in which my retaining device would be preformed if it were to be positioned in a groove located remotely from the end of a shaft.
Figure 7:
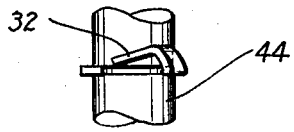
Figure 7 shows the retaining device of Figure 6 in locked position upon its shaft.

In order to simplify the operation of turning down the cross arm to locking position and to insure that bending the retaining device will not raise the flat edge of the U, the device may be coined to a lesser thickness as shown at 29 in Figure 5.

Where the groove 38 is near the end of the pin 36, as illustrated in Figure 4, the cross arm 32 is preferably preformed to the shape of Figures 2 and 3, wherein it lies in a plane parallel to that of the U, but slightly above, the distance between the plane of the cross arm and the plane of the U being sufficient to permit the cross arm to clear the end of the pin. With the cross arm in this position when it is placed on the pin, the distance through which it must be turned to lock it in place is at a minimum.

Where the groove in the pin is located at a considerable distance from the end of the pin, as shown in the pin 44 of Figure 7, it is impossible to assemble a retaining device preformed as shown in Figure 3. In this case, the washer may be initially formed as shown in Figure 6, with the locking arm 32 normal to the plane of the U. After the washer is slipped into the groove of the pin, it is turned over to the locking position, as shown in Figure 7.

Figure 8:
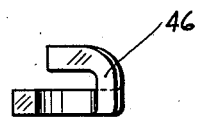
Figures 8 and 9 show retaining devices formed according to my invention, and having square and cylindrical cross-sections, respectively.
Figure 9:
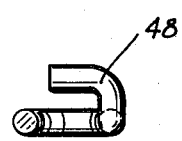

Figures 8 and 9 illustrate possible cross-sections of the retaining device differing from that of Figure 2. The retaining device 46 of Figure 8 is square in cross-section, and the retaining device 48 of Figure 9 is cylindrical in cross-section.

Figure 10:
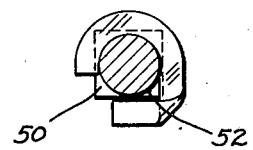
Figure 10 shows how my improved retaining device might be applied to a square cross-section pin or bolt.

Figure 10 illustrates a possible application of my improved retainer to a bolt 50 which is square in cross section, the bolt being provided with a groove having a circular inner edge 52.

Although certain particular embodiments of my invention have been described, it will be understood by those skilled in the art that the object of the invention may be attained by the use of constructions different in certain respects from those disclosed without departing from the underlying principles of the invention. I, therefore, desire by the following claims to include within the scope of my invention all such variations and modifications by which substantially the results of my invention may be attained through the use of substantially the same or equivalent means.

I claim:

1. For use with a circumferentially grooved pin, a retaining device having a U-shaped portion fitting in said groove, and an extension on one of the U-arms bent laterally and downwardly from a point above the plane of the U to cross the open end of said U and thereby hold the retaining device in place.

2. In combination, a pin having a peripheral groove and a chamfered end, and a retaining device having a U-shaped portion adapted to fit in the groove and an extension on one of the U-arms crossing the top of the U and adapted to slide over the chamfered portion of the pin into contact with the outer surface thereof.

3. In combination, a pin having a peripheral groove, and a retaining device having a U-shaped portion adapted to fit in the groove and an extension on a single one of the U-arms crossing the top of the U and adapted to slide over the end of the pin into contact with the outer surface thereof.

4. A retaining washer comprising a wire having one end thereof turned to form a U-shaped portion adapted to fit in a peripheral groove on a pin or like element and having the other end thereof turned upwardly and laterally forming a cross arm above the U which locks the retaining washer in place.

5. A retaining washer comprising a wire having one end thereof turned to form a U-shaped portion adapted to fit in a peripheral groove on a pin or like element and having the other end thereof turned upwardly and laterally forming a cross arm above the U which locks the retaining washer in place, the wire being coined at the bend formed between the cross arm and the remainder of the arm.

6. For use with a member having a peripheral groove, a retaining washer having a substantially U-shaped portion adapted to fit in said groove and a portion constituted by an extension of one side of the U turned upwardly and laterally to extend across the open end of the U.

7. For use with a member having a peripheral groove, a retaining washer having a substantially U-shaped portion adapted to fit in said groove and a portion constituted by an extension of one side of the U turned upwardly and laterally to extend across the open end of the U, the cross extension lying in a plane substantially parallel to the plane of the U but at a distance above the plane of the U sufficient to clear the end of the member having the peripheral groove.

8. For use with a member having a peripheral groove, a retaining washer having a substantially U-shaped portion adapted to fit in said groove and a portion constituted by an extension of one side of the U turned upwardly and laterally to extend across the open end of the U, the cross extension lying in a plane substantially parallel to the plane of the U but at a distance above the plane of the U sufficient to clear the end of the member having the peripheral groove, and the distance between the inner edge of the cross extension and the curved inner edge of the U being less than the diameter of the grooved member but greater than the inner diameter of the groove.

9. For use with a member having a peripheral groove, a retaining washer having a substantially U-shaped portion adapted to fit in said groove and a portion constituted by an extension of one side of the U turned upwardly and laterally to extend across the open end of the U, the cross extension prior to assembly lying in a plane substantially parallel to the plane of the U but at a distance above the plane of the U sufficient to clear the end of the member having the peripheral groove, and the cross extension after assembly being inclined downwardly toward the plane of the U to contact the periphery of the grooved member.

10. For use with a member having a peripheral groove, a retaining washer having a substantially U-shaped portion adapted to fit in said groove to prevent said washer from moving longitudinally on said member, and a portion constituted by an extension of one side of the U turned upwardly and laterally to extend across the open end of the U, the cross extension after assembly being inclined downwardly toward the plane of the U to contact the periphery of the grooved member and thereby hold the washer in position on the aforesaid member.

11. For use with a member having a peripheral groove, a retaining washer having a substantially U-shaped portion adapted to fit in said groove and a portion constituted by an extension of one side of the U turned upwardly and laterally to extend across the open end of the U, the cross extension being turned about an axis inclined at approximately 45 degrees to the arms of the U and extending parallel to the plane of the U midway between said plane and that of the cross extension.

RUDOLPH A. GOEPFRICH.